US012684638B2

(12) United States Patent (10) Patent No.: US 12,684,638 B2
Bi et al. (45) Date of Patent: Jul. 14, 2026

(54) METHODS AND APPARATUS FOR LOGICAL CHANNEL AGGREGATION

(71) Applicant: Huawei Technologies Co., Ltd., Shenzhen (CN)

(72) Inventors: Hao Bi, Lake Zurich, IL (US); Jialin Zou, Randolph, NJ (US); Yunsong Yang, San Diego, CA (US); Mazin Ali Al-Shalash, Frisco, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 497 days.

(21) Appl. No.: 18/188,764

(22) Filed: Mar. 23, 2023

(65) Prior Publication Data

US 2023/0262809 A1 Aug. 17, 2023

Related U.S. Application Data

(63) Continuation of application No. PCT/US2021/056042, filed on Oct. 21, 2021.

(60) Provisional application No. 63/094,622, filed on Oct. 21, 2020.

(51) Int. Cl.
H04W 4/00 (2018.01)
H04W 76/15 (2018.01)

(52) U.S. Cl.
CPC .................................. H04W 76/15 (2018.02)

(58) Field of Classification Search
CPC ................................ H04W 4/06; H04W 76/15
See application file for complete search history.

(56) References Cited

U.S. PATENT DOCUMENTS

2016/0182276 A1* 6/2016 Wu ........................ H04W 76/19
370/225
2022/0124463 A1* 4/2022 Zhang ..................... H04W 4/06

OTHER PUBLICATIONS

LG Electronics Inc., "[Pre114-e][001][MBS] Summary 8.1.2.1 MBS Connected mode Reliability (LGE)," 3GPP TSG-RAN2 #114e, R2-2106419, May 19-27, 2021, 9 pages.
Futurewei, "Service Continuity during Dynamic PTM/PTP Switch with Logical Channel Aggregation," 3GPP TSG-RAN WG2 Meeting #112e, R2-2009305, Nov. 2-13, 2020, 3 pages.
Futurewei, "Service Continuity during Dynamic PTM/PTP Switch with Logical Channel Aggregation," 3GPP TSG-RAN WG2 Meeting #113e, R2-2100356, Jan. 25, 2021-Feb. 5, 2021, 3 pages.
Futurewei, "Protocol Architecture of MRB with Dynamic PTM/PTP Switch," 3GPP TSG-RAN WG2 Meeting #114 electronic, R2-2106009, May 19-27, 2021, 3 pages.
Futurewei, "ARQ of PTM with Logical Channel Aggregation," 3GPP TSG-RAN WG2 Meeting #112e, R2-2009304, Nov. 2-13, 2020, 4 pages.
QUALCOMM Inc., "NR Multicast Radio Bearer Architecture aspects," 3GPP TSG-RAN WG2 Meeting #111e, R2-2006793, Aug. 17-28, 2020, 11 pages.

(Continued)

*Primary Examiner* — Omoniyi Obayanju
(74) *Attorney, Agent, or Firm* — Slater Matsil, LLP

(57) ABSTRACT

A method for operating a radio link control (RLC) entity of a communication equipment includes the RLC entity being configured for receiving data over a plurality of logical channels, the RLC entity receiving RLC protocol data units (PDUs) generated by a plurality of transmitting RLC entities over a plurality of logical channels, generating RLC service data units (SDUs) from the RLC PDUs, and delivering the RLC SDUs to an upper layer.

20 Claims, 10 Drawing Sheets

(56)                    References Cited

OTHER PUBLICATIONS

Mediatek Inc., "UE Reception Model of MBS Radio Bearer and its Dynamic PTM/PTP switch," 3GPP TSG-RAN WG2 Meeting #111 electronic, R2-2006575, Aug. 17-28, 2020, 15 pages.
CATT, "Discussion on Dynamic PTM and PTP Switch with Service Continuity," 3GPP TSG-RAN WG2 Meeting #111 electronic, R2-2006594, 12 pages.
"3rd Generation Partnership Project; Technical Specification Group Radio Access Network; NR; Radio Link Control (RLC) protocol specification (Release 16)," vol. RAN WG2, No. V16.1.0, Jul. 24, 2020, 33 pages.

* cited by examiner

```
RLC-BearerConfig ::=                        SEQUENCE {
    logicalChannelIdentity
LogicalChannelIdentity,
    servedRadioBearer                       CHOICE {
        srb-Identity                            SRB-Identity,
        drb-Identity                            DRB-Identity
    }
OPTIONAL,    -- Cond LCH-SetupOnly
    reestablishRLC                          ENUMERATED {true}
OPTIONAL,    -- Need N
    rlc-Config                              RLC-Config
OPTIONAL,    -- Cond LCH-Setup
    mac-LogicalChannelConfig
LogicalChannelConfig                        OPTIONAL,    -- Cond LCH-
Setup
    ...,
    [[
    rlc-Config-v1610                        RLC-Config-v1610
OPTIONAL    -- Need R
    ]]
    [[
    rlc-Config-v17xy                        RLC-Config-v17xy
OPTIONAL    -- Need R
    ]]
}
RLC-Config-v17xy ::=                        SEQUENCE {
    dl-AM-RLC-v17xy                             DL-AM-RLC-v17xy
}

DL-AM-RLC-v17xy ::=                         SEQUENCE {
  aggregatedLogicalChannelIdentity
LogicalChannelIdentity,
    ...
}
```

Fig. 5

METHODS AND APPARATUS FOR LOGICAL CHANNEL AGGREGATION

CROSS-REFERENCE TO RELATED APPLICATIONS

This disclosure is a continuation of International Patent Application No. PCT/US2021/056042 filed on Oct. 21, 2021, entitled "Methods and Apparatus for Logical Channel Aggregation," which claims the benefit of U.S. Provisional Application No. 63/094,622 filed on Oct. 21, 2020, entitled "Methods and Apparatus for Logical Channel Aggregation," applications of which are incorporated herein by reference in their entireties.

TECHNICAL FIELD

The present disclosure relates generally to wireless communications, and, in particular embodiments, to methods and apparatus for logical channel aggregation.

BACKGROUND

Current generation wireless communications systems provide high data rates for mobile communications devices to enable a rich multi-media environment for users of the mobile communications devices. However, the complexity of applications available to the users continues to increase, along with the need for increased throughput and lower latency.

SUMMARY

According to a first aspect, a method for operating receiving device of a communication equipment is provided. The method comprises the receiving device receiving from a transmitting device, a signaling message and the receiving device reconfiguring a receiving RLC entity of the receiving device, to process data received from a plurality of logical channels in accordance with the signaling message.

In a first implementation form of the method according to the first aspect, the signaling message indicates a reconfiguration with a reestablishment of a receiving RLC entity.

In a second implementation form of the method according to the first aspect or any preceding implementation form of the first aspect, the signaling message indicates a reconfiguration without a reestablishment of a receiving RLC entity.

In a third implementation form of the method according to the first aspect or any preceding implementation form of the first aspect, the data received from the plurality of logical channels is generated by a plurality of transmitting RLC entities of a transmitting device and transmitted on the plurality of logical channels, each of the plurality transmitting RLC entities being respectively associated with each of the channels comprising the plurality of logical channels.

In a fourth implementation form of the method according to the first aspect or any preceding implementation form of the first aspect, the reconfiguring comprises enabling logical channel aggregation, wherein the receiving RLC entity is configured to stop processing data received from a logical channel and to process data received from the plurality of logical channels.

In a fifth implementation form of the method according to the first aspect or any preceding implementation form of the first aspect, the reconfiguring comprises disabling logical channel aggregation, wherein the receiving RLC entity is configured to stop processing data received from the plurality of logical channels, and to process data received from a logical channel.

In a sixth implementation form of the method according to the first aspect or any preceding implementation form of the first aspect, reconfiguring the receiving RLC entity to process data received from a plurality of logical channels comprises changing the receiving RLC entity.

In a seventh implementation form of the method according to the first aspect or any preceding implementation form of the first aspect, the signaling message is received in a RRC message.

According to a second aspect, a method for operating a radio link control (RLC) entity of a communication equipment, the RLC entity being configured for receiving data over a plurality of logical channels is provided. The method comprises the RLC entity receiving RLC protocol data units (PDUs) generated by a plurality of transmitting RLC entities over a plurality of logical channels, generating RLC service data units (SDUs) from the RLC PDUs, and delivering the RLC SDUs to an upper layer.

In a first implementation form of the method according to the second aspect, the method further comprises the plurality of logical channels comprises at least one dedicated traffic channel (DTCH) configured for the UE.

In a second implementation form of the method according to the second aspect or any preceding implementation form of the second aspect, the plurality of logical channels comprises a multicast traffic channel (MTCH).

In a third implementation form of the method according to the second aspect or any preceding implementation form of the second aspect, the RLC entity determines that one of the RLC PDUs is received with a Polling (P) bit being set to a specified value.

In a fourth implementation form of the method according to the second aspect or any preceding implementation form of the second aspect, the one of the RLC PDUs received with a Polling (P) bit being set to the specified value is received over a multicast traffic channel (MTCH).

In a fifth implementation form of the method according to the second aspect or any preceding implementation form of the second aspect, the RLC receiving entity transmits an RLC Status PDU to a communication equipment, from which the RLC PDUs are received, the RLC Status PDU comprising information acknowledging the RLC PDUs that the UE has received successfully over the plurality of logical channels.

In a sixth implementation form of the method according to the second aspect or any preceding implementation form of the second aspect, the RLC entity receives a Polling (P) bit being set in in one of the RLC PDUs and generates a RLC status report responsive to the Polling (P) bit and processing packets received from both logical channels multicast traffic channel (MTCH) and dedicated traffic channel (DTCH).

In a seventh implementation form of the method according to the second aspect or any preceding implementation form of the second aspect, the RLC entity transmits to a RLC transmitting entity of a logical channel DTCH at the transmitter, the RLC status report.

In an eighth implementation form of the method according to the second aspect or any preceding implementation form of the second aspect, the RLC status report includes a reception status of packets generated by RLC transmitting entities of both logical channels MTCH and DTCH, the reception status indicating whether the packets generated by the RLC transmitting entities were received or not received.

In a ninth implementation form of the method according to the second aspect or any preceding implementation form of the second aspect, the RLC entity receives retransmitted packets over the DTCH responsive to the RLC status report.

In a tenth implementation form of the method according to the second aspect or any preceding implementation form of the second aspect, the RLC entity receives retransmitted packets over the MTCH responsive to the RLC status report.

In an eleventh implementation form of the method according to the second aspect or any preceding implementation form of the second aspect, the RLC entity receives from the transmitting RLC entity, an RLC control PDU, the RLC control PDU indicating the start or the end of use of an RLC PDU format that includes a RLC sequence number (SN).

In a twelfth implementation form of the method according to the second aspect or any preceding implementation form of the second aspect, the RLC entity determines that one of the RLC PDUs is received with a Polling (P) bit being set to a specified value.

In a thirteenth implementation form of the method according to the second aspect or any preceding implementation form of the second aspect, the RLC entity transmits an RLC Status PDU to a communication equipment, from which the RLC PDUs are received, the RLC Status PDU comprising information acknowledging the RLC PDUs that the UE has received successfully over a MTCH and a DTCH.

According to a third aspect, a device is provided. The device being a user equipment (UE) comprising: a non-transitory memory storage comprising instructions; and one or more processors in communication with the memory storage, the one or more processors executing the instructions to receive, at an RLC entity of the UE, RLC protocol data units (PDUs) over a plurality of logical channels, generate RLC SDUs from the RLC PDUs, and deliver the RLC SDUs to an upper layer.

In a first implementation form of the device according to the third aspect, the plurality of logical channels comprises at least one dedicated traffic channel (DTCH) configured for the UE.

In a second implementation form of the device according to the third aspect or any preceding implementation form of the third aspect, the plurality of logical channels comprises a multicast traffic channel (MTCH).

In a third implementation form of the device according to the third aspect or any preceding implementation form of the third aspect, the RLC entity of the UE determines that one of the RLC PDUs is received with a Polling (P) bit being set to a specified value.

In a fourth implementation form of the device according to the third aspect or any preceding implementation form of the third aspect, the one of the RLC PDUs received with the Polling (P) bit being set to a specified value is received over a multicast traffic channel (MTCH).

In a fifth implementation form of the device according to the third aspect or any preceding implementation form of the third aspect, the device transmits an RLC Status PDU to a communication equipment, from which the RLC PDUs are received, the RLC Status PDU comprising information acknowledging the RLC PDUs that the UE has received successfully over the plurality of logical channels.

In a sixth implementation form of the device according to the third aspect or any preceding implementation form of the third aspect, the device receives a Polling (P) bit being set in in one of the RLC PDUs, and the RLC entity generates a RLC status report responsive to the Polling (P) bit and processing packets received from both logical channels MTCH and DTCH.

In a seventh implementation form of the device according to the third aspect or any preceding implementation form of the third aspect, the RLC entity of the UE transmits to a RLC transmitting entity of a logical channel DTCH at the transmitter, the RLC status report.

In an eighth implementation form of the device according to the third aspect or any preceding implementation form of the third aspect, the RLC status report includes a reception status of packets generated by RLC transmitting entities of both logical channels MTCH and DTCH, the reception status indicating whether the packets generated by the RLC transmitting entities were received or not received.

In a ninth implementation form of the device according to the third aspect or any preceding implementation form of the third aspect, the RLC entity of the UE receives retransmitted packets over the DTCH responsive to the RLC status report.

In a tenth implementation form of the device according to the third aspect or any preceding implementation form of the third aspect, the RLC entity of the UE receives retransmitted packets over the MTCH responsive to the RLC status report.

In an eleventh implementation form of the device according to the third aspect or any preceding implementation form of the third aspect, the RLC entity of the UE receives from the transmitting RLC entity, an RLC control PDU, the RLC control PDU indicating the start or the end of use of an RLC PDU format that includes a RLC sequence number (SN).

In a twelfth implementation form of the device according to the third aspect or any preceding implementation form of the third aspect, the device determines that one of the RLC PDUs is received with a Polling (P) bit being set to a specified value.

In a thirteenth implementation form of the device according to the third aspect or any preceding implementation form of the third aspect, the device transmits an RLC Status PDU to a communication equipment, from which the RLC PDUs are received, the RLC Status PDU comprising information acknowledging the RLC PDUs that the UE has received successfully over a MTCH and a DTCH. An advantage of a preferred embodiment is to enhance the efficiency and reliability of NR broadcast and multicast services (MBS) via aggregation of multiple logical channels for a RLC receiving entity to handle packets transmitted over these logical channels.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 illustrates a RRC Reconfiguration Message of Logical Channel Aggregation according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1A:
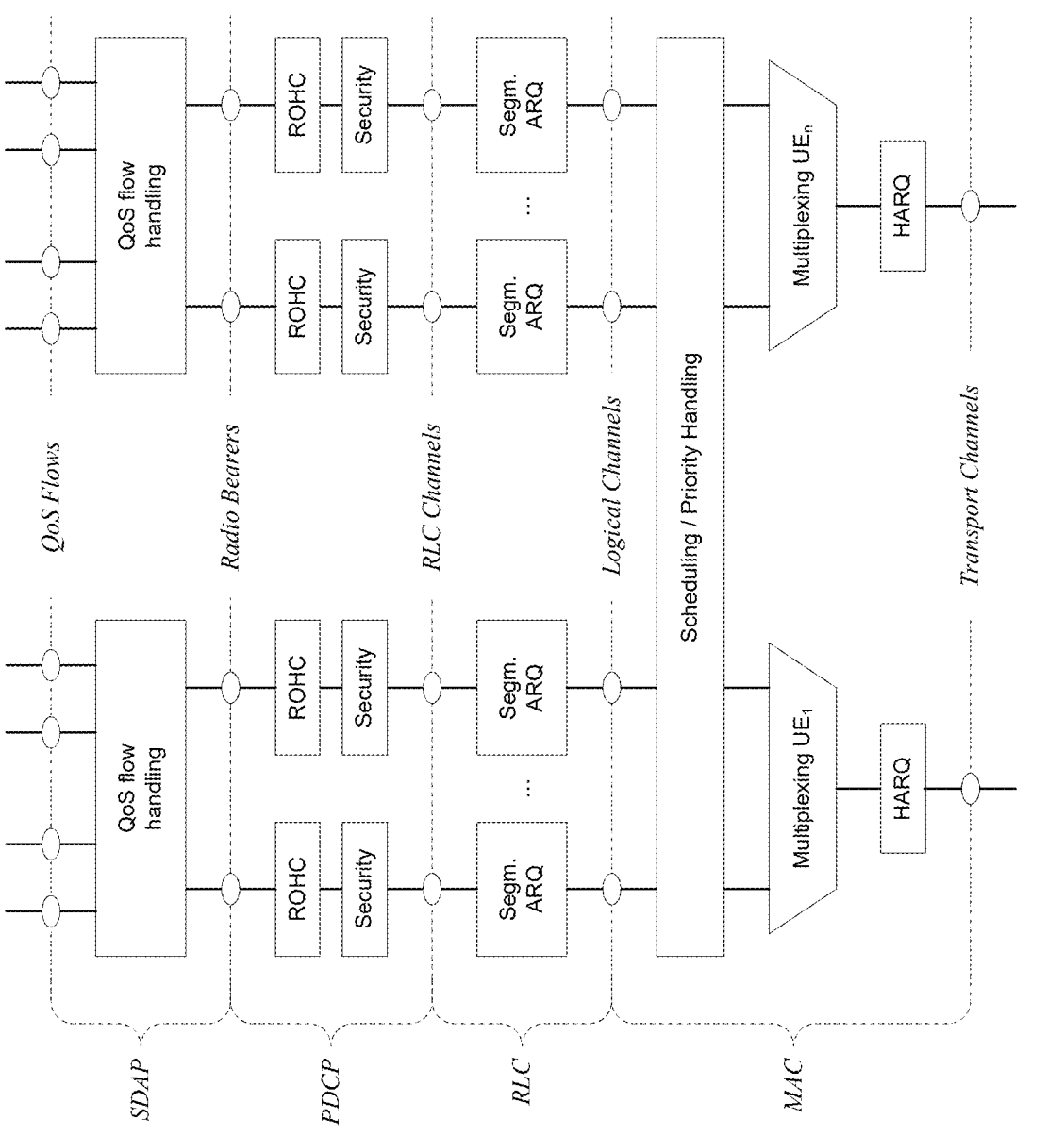
FIG. 1A illustrates the layer 2 architecture for 5G NR user plane downlink.
Figure 1B:
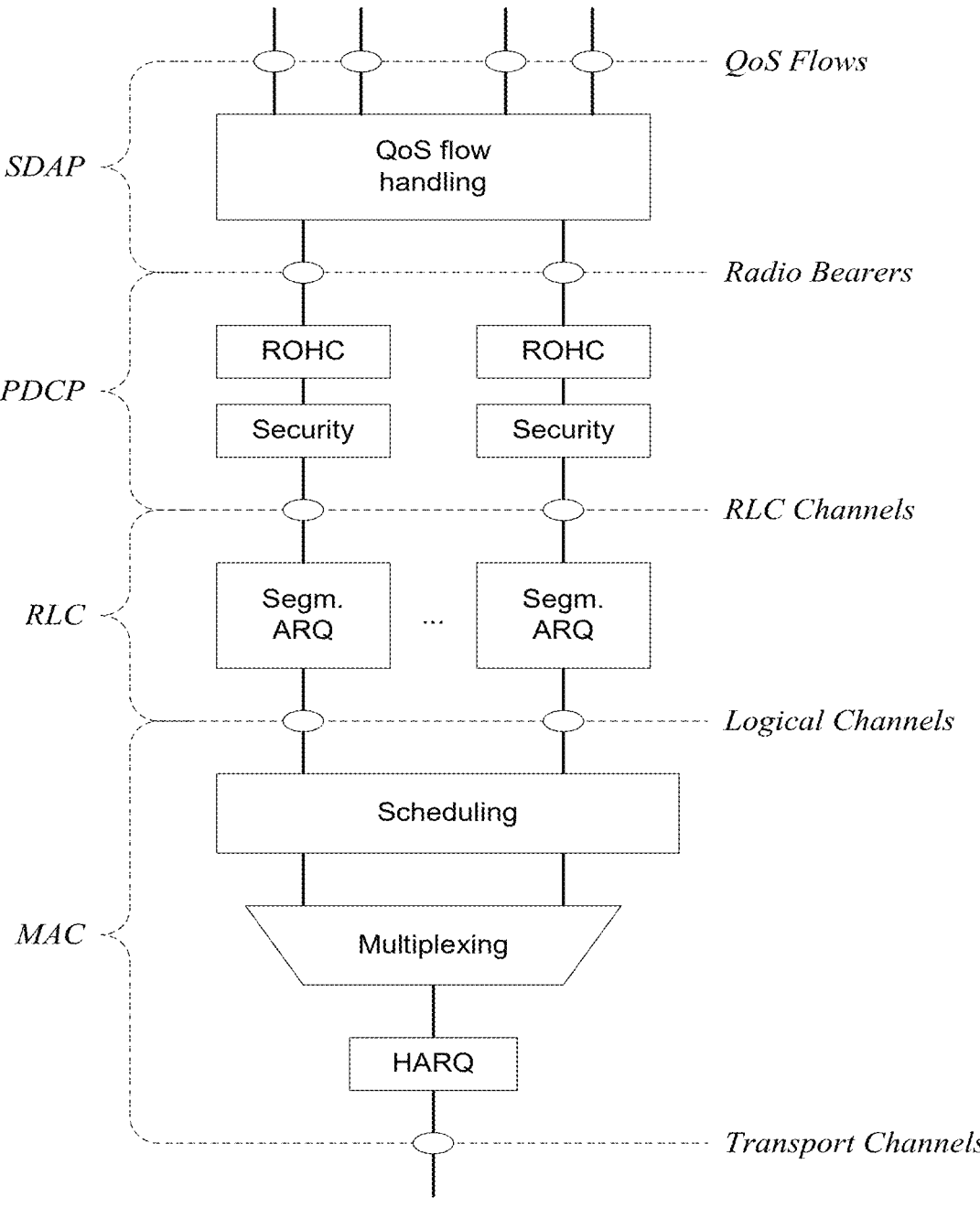
FIG. 1B illustrates layer 2 architecture for 5G NR user plane uplink.

FIGS. 1A and 1B illustrate the Layer 2 architecture for 5G NR user plane downlink (DL) and uplink (UL), respectively. The layer 2 of the fifth generation (5G) new radio (NR) user plane is split into the following sublayers: Medium Access Control (MAC), Radio Link Control (RLC), Packet Data Convergence Protocol (PDCP) and Service Data Adaptation Protocol (SDAP).

Currently, an RLC entity is associated with one logical channel. It handles only the transmission and/or reception of this logical channel. In dual-connectivity (DC) and PDCP duplication, data of a data radio bearer is transmitted and received by PDCP entity over multiple RLC bearers. Each RLC bearer corresponds to a logical channel, where RLC bearer carries RLC SDU (service data unit) and logical channel carries RLC PDU (protocol data unit). RLC entities, which handle these logical channels individually, operate independently.

The Third Generation Partnership Project (3GPP) has concluded that both point-to-multipoint (PTM) and point-to-point (PTP) delivery of the multicast and broadcast services (MBS) data to UEs, and dynamic switching between the use of these two delivery mechanisms should be supported. 3GPP is currently revising the 5G NR specifications to enable both delivery mechanisms and the dynamic switching between the use of them in the radio access network (RAN).

PTP is the conventional way for delivering data from a sender, such as a next generation Node B (gNB) or a user equipment (UE) to a recipient, such as a UE when the sender is a gNB, or a gNB when the sender is a UE, wherein not only the data can be delivered from the sender to the recipient, but also acknowledgements (including negative acknowledgements) with regard to data reception can be returned from the recipient to the sender to facilitate automatic repeat request (ARQ) retransmission (which is a selective retransmission scheme) in order to meet certain QoS requirement. The ARQ retransmission can take place because, with the PTP, a dedicated logical channel is configured (and associated lower layer resources are provisioned) in both the forward and the reverse directions, respectively, for each gNB-UE pair. To deliver the MBS data to multiple UEs in the PTP manner would require a same MBS data be transmitted multiple times, each time to an individual UE among the multiple UEs, which is very inefficient in the utilization of the radio resource.

On the other hand, PTM is an efficient way (in terms of radio resource utilization) for delivering the MBS data to a large number of UEs simultaneously. However, PTM is also known to be unreliable due to the lack of feedback mechanism that allows the large number of UEs to provide their respective acknowledgements of data reception in the reverse direction. Hence, methods and apparatus are needed to enhance both the efficiency and the reliability for delivering MBS data to UEs.

According to an example embodiment, a radio bearer, multicast radio bearer (MRB), can be delivered via multiple logical channels, one of the multiple logical channels being the MTCH, and the remaining logical channels being DTCHs, each of the DTCH being associated with the MTCH in term of the use of logical channel aggregation between the DTCH and the MTCH, as described herein, has been enabled.

On the transmitting side (e.g., a RAN node such as a gNB or a device such as a UE), a PDCP entity configured for the MRB may be associated with more than one RLC entities, with one RLC entity being configured for the MTCH and being referred to as the PTM RLC entity and the remaining RLC entities being configured for the respective DTCHs and being referred to as the PTP RLC entities, the operations of the PTM RLC entity and the PTP RLC entities being inter-dependent on one another.

On the receiving side (e.g., a device such as a UE or a RAN node such as a gNB), a single RLC entity may be configured for the receiver to aggregate and process the RLC PDUs received over the MTCH and the DTCH, and to deliver the processed data (i.e., RLC SDUs) to a receiving PDCP entity, which is configured for the MRB on the receiver side.

Logical channel aggregation can be done by allowing some cooperation among transmitting RLC entities of multiple logical channels, so that a single receiving RLC entity can handle packets transmitted on multiple logical channels.

Although the example embodiments are described as being applicable to infrastructure based 5G NR MBS markets (for both the gNB and UE sides), they are also applicable to broadcast or multicast use cases without the infrastructure, such as in vehicle-to-everything (V2X), public safety network, PTM communications in a peer-to-peer (P2P) network, etc.

Figure 2:
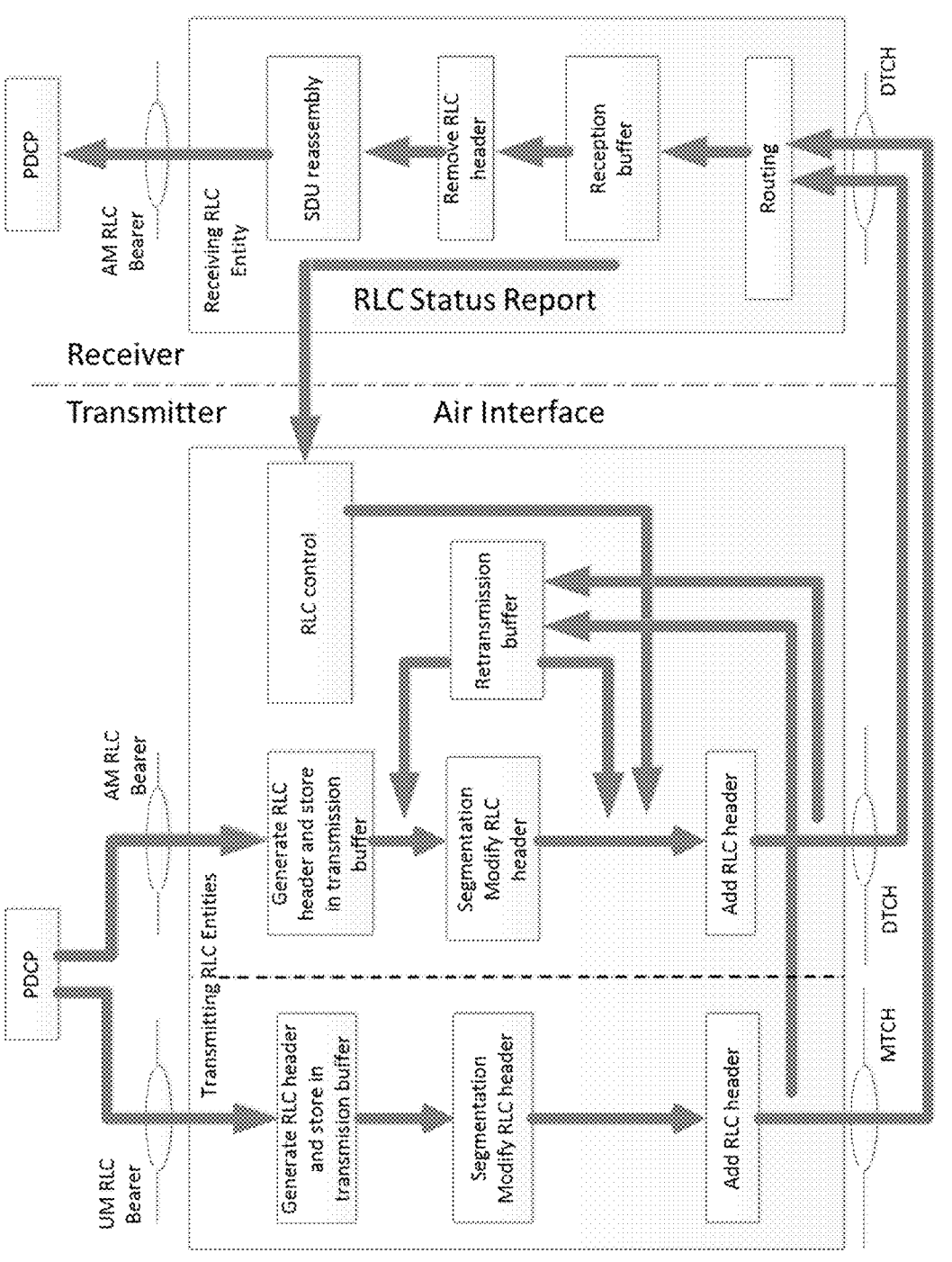
FIG. 2 illustrates Logical Channel Aggregation according to example embodiment 1 presented herein.

FIG. 2 shows example embodiment 1 of the logical channel aggregation. Data received from logical channels MTCH and DTCH are processed by an RLC receiving entity, associated with DTCH at a receiver (a UE or similar wireless device). Data transmitted on logical channels MTCH and DTCH are generated at a transmitter (a gNB or similar RAN node) by separate RLC transmitting entities, which are associated with logical channels MTCH and DTCH, respectively. After transmission, RLC PDU packets of the logical channel MTCH are stored in the retransmission buffer of the RLC transmitting entity associated with the logical channel DTCH. RLC status report generated by the receiving RLC entity of the logical channel DTCH, after processing packets received from both logical channels MTCH and DTCH, is sent over the UL to the RLC transmitting entity of the logical channel DTCH at the transmitter. The RLC status report includes the reception (or lack of reception, i.e., missing) status of the packets generated by the RLC transmitting entities of both logical channels MTCH and DTCH. RLC control in the RLC transmitting entity of the logical channel DTCH manages the retransmission of packets stored in the retransmission buffer based on the received RLC status report. ARQ of PTM transmission over MTCH may be done by performing first transmission of an RLC SDU over MTCH, sending RLC status report through DTCH on UL, and performing retransmission of an RLC SDU through DTCH on DL.

In one way of obtaining the RLC status reports (i.e., the RLC Status PDUs) from the UEs, the gNB may poll the UEs. The conventional way for a gNB to poll a UE, only when acknowledged mode (AM) RLC is used, is to send an AM RLC Data (AMD) PDU to the UE with the Polling (P) bit in the header of the AMD PDU being set to 1. But to apply this approach to 5G NR MBS means that the gNB needs to send an AMD PDU to each UE, individually, via their respective DTCHs, after the gNB has sent the MBS data over the MTCH. This polling approach is very inefficient in that multiple AMD PDUs have to be sent to poll the multiple UEs. Hence, a multicast polling mechanism is also needed.

In accordance with embodiment 1, as illustrated in FIG. 2, the PTM RLC entity in the gNB is an unacknowledged mode (UM) transmitting RLC entity. However, this UM transmitting RLC entity operates in the following ways:

The PTM RLC entity assigns an RLC sequence number (SN) to every RLC SDU, whether the RLC SDU is segmented or not;

The PTM RLC entity uses new UM RLC Data (UMD) PDU formats that all include a P bit and an SN field in a header, with the SN length being either 12 bits or 18 bits (same as in AM RLC), the SN field being included even when the Segmentation Indication (SI) field in the UMD PDU indicates that the UMD PDU contains a whole RLC SDU;

When the PTM RLC entity wishes to poll multiple UEs (to solicit RLC Status PDUs from these UEs), e.g., when the polling is triggered by PDU_WITHOUT_POLL or BYTE_WITHOUT_POLL of the RLC entity exceeding the respective threshold or the transmission buffer of the PTM RLC entity becoming empty after the current UMD PDU being transmitted, the PTM RLC entity sets the P bit in the header of the current UMD PDU to 1 before submitting the UMD PDU to lower layer for transmission; and a reversed definition of the P bit being set to 1 or 0 is also possible.

When logical channel aggregation is enabled between the MTCH and any DTCHs, the PTM RLC entity needs to maintain a transmission window and transmits data accordingly, so that the RLC SN of any copies of RLC PDUs that it places in the retransmission buffers of the AM RLC entities respectively configured for those DTCHs won't be confused with RLC SN of any RLC PDUs pending acknowledgement in those retransmission buffers (which means that the transmission window of the PTM RLC entity may be stalled by the slowest DTCH associated with the MTCH, in which situation, the gNB can minimize such stalling by prioritizing the slowest DTCH in scheduling); and When submitting an RLC PDU to lower layer, the PTM RLC entity places a copy of the RLC PDU in retransmission buffer of AM RLC entity respectively configured for the DTCHs, for which logical channel aggregation having been respectively enabled.

The P bit being set to 1 in a UMD PDU transmitted over the MTCH serves as a multicast polling to all the UEs that are listening to the MTCH. And, each of these UEs should send back an RLC Status PDU via their respective DTCHs on the UL, in response to the multicast polling. Hence, this multicast polling mechanism is more radio efficient than the conventional dedicated polling.

In accordance with another alternative embodiment, example embodiment 2, the logical channel aggregation is achieved in a similar way as illustrated in FIG. 2, except that the PTM RLC entity of the gNB is considered as an AM RLC entity and this AM RLC entity operates in the following ways:

When the PTM RLC entity wishes to poll multiple UEs (to solicit RLC Status PDUs from these UEs), e.g., when the polling is triggered by PDU_WITHOUT_POLL or BYTE_WITHOUT_POLL of the RLC entity exceeding the respective threshold or the transmission buffer of the PTM RLC entity becoming empty after the current AMD PDU being transmitted, the PTM RLC entity sets the P bit in the header of the current AMD PDU to 1 before submitting the AMD PDU to lower layer for transmission; and a reversed definition of the P bit being set to 1 or 0 is also possible.

When logical channel aggregation is enabled between the MTCH and any DTCH, the PTM RLC entity maintains its transmission window and transmits data accordingly, so that the RLC SN of any copies of RLC PDUs that it places in the retransmission buffers of the AM RLC entities configured for those DTCHs won't be confused with RLC SN of any RLC PDUs pending acknowledgement in those retransmission buffers; and when the MTCH isn't involved in logical channel aggregation with any other logical channel, the PTM RLC entity maintains its transmission window by setting TX_Next_Ack to be equal to (TX_Next−AM_Window_Size+1); and The PTM RLC entity may not have its own retransmission buffer; and, after submitting an RLC PDU to lower layer, the PTM RLC entity places a copy of the RLC PDU in the retransmission buffer of AM RLC entity respectively configured for the DTCHs, with which logical channel aggregation having been respectively enabled.

The P bit being 1 in an AMD PDU transmitted over the MTCH serves as a multicast polling to all the UEs that are listening to the MTCH. And, each of these UEs should send back an RLC Status PDU via their respective DTCHs on the UL, in response to the multicast polling. Hence, this multicast polling mechanism is more radio efficient than the conventional dedicated polling.

Figure 3:
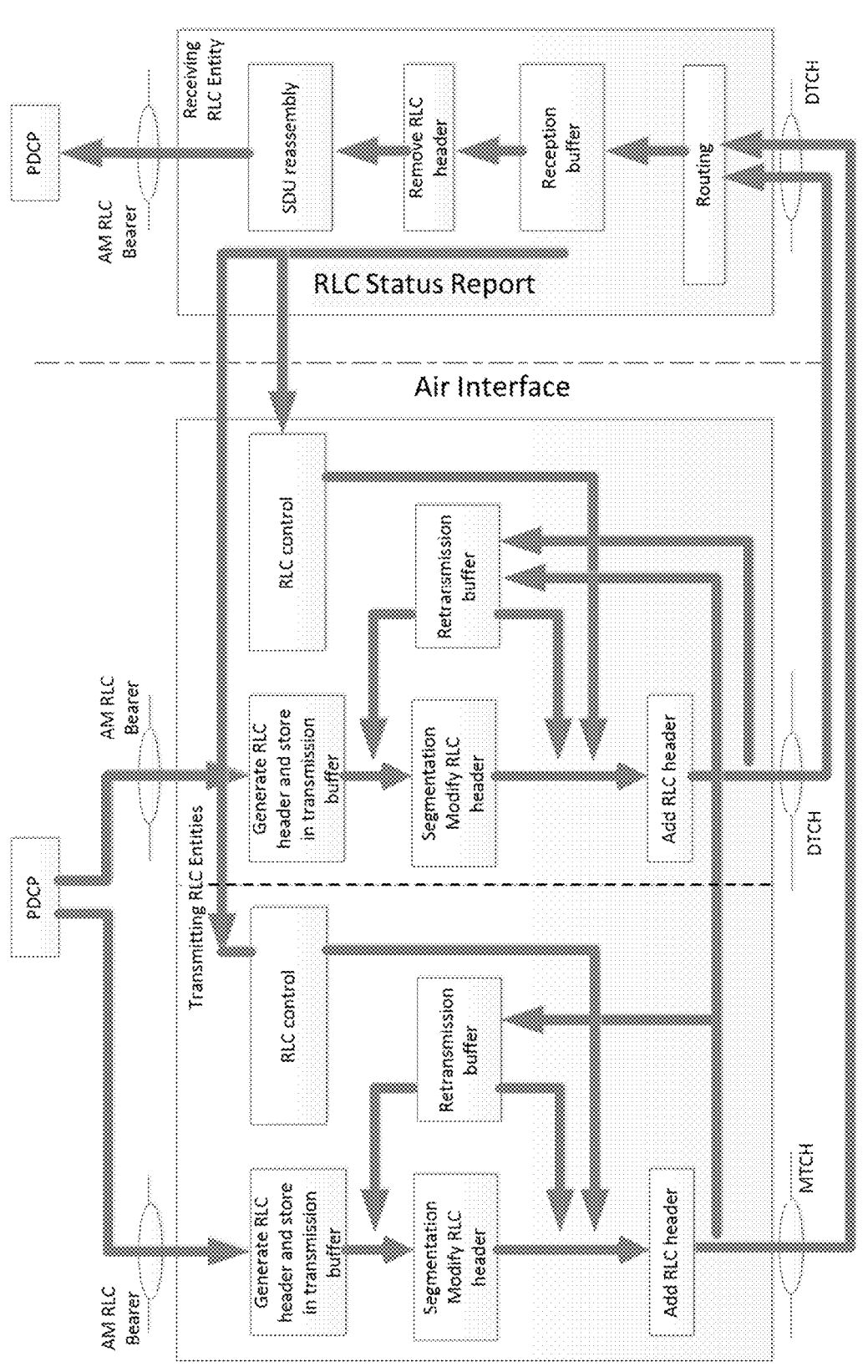
FIG. 3 illustrates Logical Channel Aggregation according to example embodiment 3 presented herein.

FIG. 3 shows another embodiment, example embodiment 3, of the logical channel aggregation. Data received from logical channels MTCH and DTCH are processed by an RLC receiving entity, associated with DTCH at a receiver (a UE or similar wireless device). Data transmitted on logical channels MTCH and DTCH are generated at a transmitter (a gNB or similar RAN node) by separate RLC transmitting entities, which are associated with logical channels MTCH and DTCH, respectively. After transmission, RLC PDU packets of the logical channels MTCH and DTCH are stored in the retransmission buffer of their respective RLC transmitting entities, and RLC PDU packets of the logical channel MTCH is also forwarded to and stored in the retransmission buffer of the RLC transmitting entity associated with the logical channel DTCH. RLC status report generated by the receiving RLC entity of the logical channel DTCH, after processing packets received from both logical channels MTCH and DTCH, is sent over UL to the RLC transmitting entities of the logical channels MTCH and DTCH at the transmitter. The RLC status report includes the reception (or lack of reception, i.e., missing) status of the packets generated by the RLC transmitting entities of both logical channels MTCH and DTCH. RLC controls in the RLC transmitting entities of the logical channels MTCH and DTCH manage the retransmission of packets stored in the retransmission buffer based on the received RLC status report. A gNB can perform first transmission of an RLC SDU in PTM mode over MTCH; UE sends its RLC status report through DTCH on UL, and the gNB performs retransmission of an RLC SDU on DL either individually to a UE through DTCH or collectively to a group of UEs through MTCH. The retransmission of an RLC SDU can be done by transmitting segments of an RLC SDU in different transmissions. These retransmissions of segments of an RLC SDU can be done flexibly over either MTCH or DTCH, on a segment by segment decision based on the need of retransmission of a segment of RLC SDU either individually to a UE through DTCH or collectively to a group of UEs through MTCH.

For every RLC SDU, RLC sequence number (SN) can be included in every RLC PDU of the logical channel which is aggregated. In the above embodiments, RLC SN is included in RLC PDUs of the logical channels MTCH and DTCH, when they are generated at the RLC transmitting entities at the transmitter. SN in the RLC PDUs generated by the RLC transmitting entity of the logical channel MTCH and by the RLC transmitting entity of the logical channel DTCH may share a common series of SN. An SN is assigned to a RLC SDU and included in its RLC PDU in numerical order and used only once in the transmitter transmission window, regardless if the RLC PDU is generated by the RLC transmitting entity of the logical channel MTCH or by the RLC transmitting entity of the logical channel DTCH. RLC PDUs generated by the aggregated logical channels, such as the MTCH and DTCH, may be of the same RLC PDU format, e.g., a PDU format always with SN being present, regardless if it carries a whole RLC SDU or a segment of RLC SDU.

An RLC control PDU can be used by the transmitter to indicate to the receiver the start or the end of use of an RLC PDU format that includes SN. An RLC control PDU can initiate the SN to a certain number, e.g., zero, although other values are possible.

When logical channel aggregation is enabled with RLC entity reestablishment, state variables of the RLC receiving entity, such as RX_Next, RX_Next_Highest, RX_Highest_Status, can be set to the SN of the first received RLC PDU. When logical channel aggregation is enabled without RLC entity reestablishment, state variables of the receiving RLC entity, such as RX_Next, RX_Next_Highest, RX_Highest_Status, continue without being reset as RLC receiving entity operates.

These state variables are used in the RLC receiving entity as follows:

RX_Next holds the value of the SN following the last in-sequence completely received RLC SDU, and it serves as the lower edge of the receiving window, RX_Next_Highest holds the value of the SN following the SN of the RLC SDU with the highest SN among received RLC SDUs, and RX_Highest_Status holds the highest possible value of the SN which can be indicated by "ACK_SN" when a STATUS PDU needs to be constructed.

When enabling/disabling logical channel aggregation involves the change of the RLC receiving entity, e.g., the RLC receiving entity of the logical channel MTCH is used without logical channel aggregation and the RLC receiving

Figure 4:
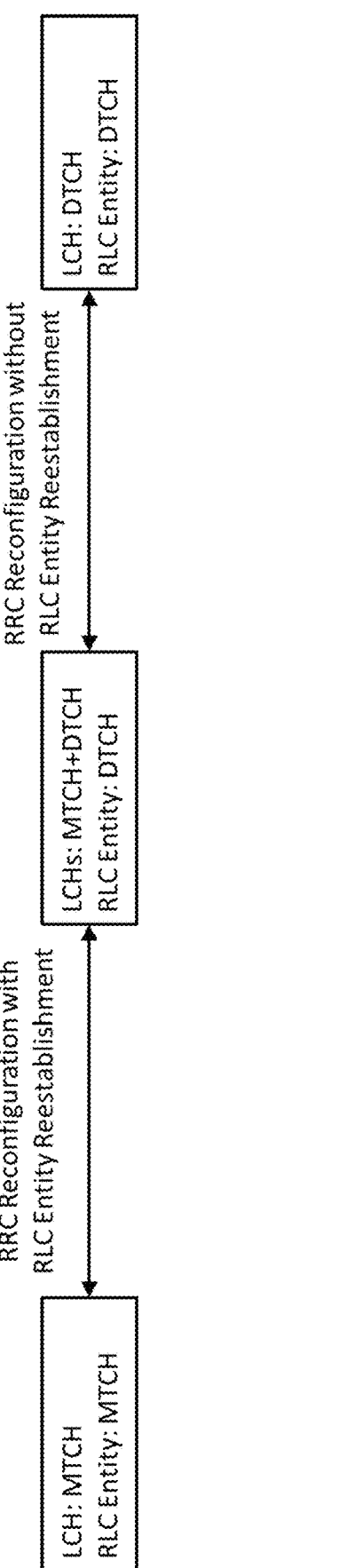
FIG. 4 illustrates the RRC Reconfiguration for the Enabling/Disabling of Logical Channel Aggregation according to example embodiments presented herein.

10 entity of the logical channel DTCH is used during logical channel aggregation, the transmitter can send to the receiver a RRC message indicating reconfiguration with reestablishment of RLC entity, and the receiver performs the reconfiguration and enabling/disabling of logical channel aggregation accordingly. Conversely, if enabling/disabling logical channel aggregation doesn't involve the change of the RLC receiving entity, e.g., the RLC receiving entity of the logical channel DTCH is used both without logical channel aggregation and during logical channel aggregation, the transmitter can send to the receiver a RRC message indicating reconfiguration without reestablishment of RLC entity, and the receiver performs the reconfiguration and enabling/disabling of logical channel aggregation accordingly. FIG. 4 illustrates the relation between RLC entity reestablishment and the enabling/disabling of logical channel aggregation.

In an embodiment, in which UE hasn't been configured with MRB, both MTCH for PTM mode and DTCH for PTP mode can be configured to the UE and logical channel aggregation can be enabled for an MRB, as follows:

Configuration of RLC entity of MTCH for PTM is included in the configuration of MRB;

Configuration of RLC entity of DTCH for PTP is included in the configuration of MRB;

Logical channel aggregation is activated by configuring and identifying an RLC receiving entity for handling RLC PDUs of MTCH and DTCH;

Initial state variables of the RLC receiving entity, such as RX_Next, RX_Next_Highest, RX_Highest_Status, being set to the SN of the first received RLC PDU;

MAC layer at the receiver provides RLC PDUs of MTCH and DTCH to the RLC receiving entity associated with the MRB.

In an embodiment, in which an MRB is already carried in PTM over a logical channel MTCH, configuring a logical channel DTCH for PTP and enabling logical channel aggregation of the MTCH and DTCH on a UE can be done as follows:

RLC entity of PTP transmission is configured and added to the configuration of MRB; and Initial state variables of the RLC receiving entity, such as RX_Next, RX_Next_Highest, RX_Highest_Status, being set to the SN of the first received RLC PDU;

MAC layer at the receiver provides RLC PDUs of MTCH and DTCH to the RLC receiving entity associated with the logical channel aggregation.

In an embodiment, in which an MRB is in PTP mode over a logical channel DTCH for a UE, and the corresponding MBS service is carried in PTM mode over a logical channel MTCH for other UEs, configuring the UE with the MTCH and enabling logical channel aggregation of the MTCH and DTCH on the UE can be done as follows:

RLC entity of MTCH for PTM transmission is configured and added to the configuration of MRB;

RLC entity of PTP transmission (of the original DTCH) is reestablished, with state variables of the RLC receiving entity, such as RX_Next, RX_Next_Highest, RX_Highest_Status, being set to the SN of the first received RLC PDU;

PDCP data recovery (due to the RLC reestablishment on DTCH) and catch-up (due to the transmission gap of PDCP data between MTCH and DTCH) may be needed over DTCH;

RLC SN on DTCH are set in the way that PDCP data recovery and catch-up use the same RLC SN as those of the corresponding PDCP packets on MTCH;

MAC layer at the receiver provides RLC PDUs of MTCH and DTCH to the RLC receiving entity associated with the MRB.

Identities of the aggregated logical channels can be provided in an RRC message when logical channel aggregation is configured. For example, an additional logical channel identity can be added into a RLC bearer configuration to indicate that packets of the logical channel with this logical channel identity are handled by the RLC receiving entity configured for the RLC bearer. FIG. 5 shows an embodiment of RRC message to configure logical channel aggregation. Conversely, the additional logical channel identity added into the RLC bearer configuration can indicate the RLC receiving entity to handle the packets of the logical channel corresponding to the RLC bearer.

Figure 6:
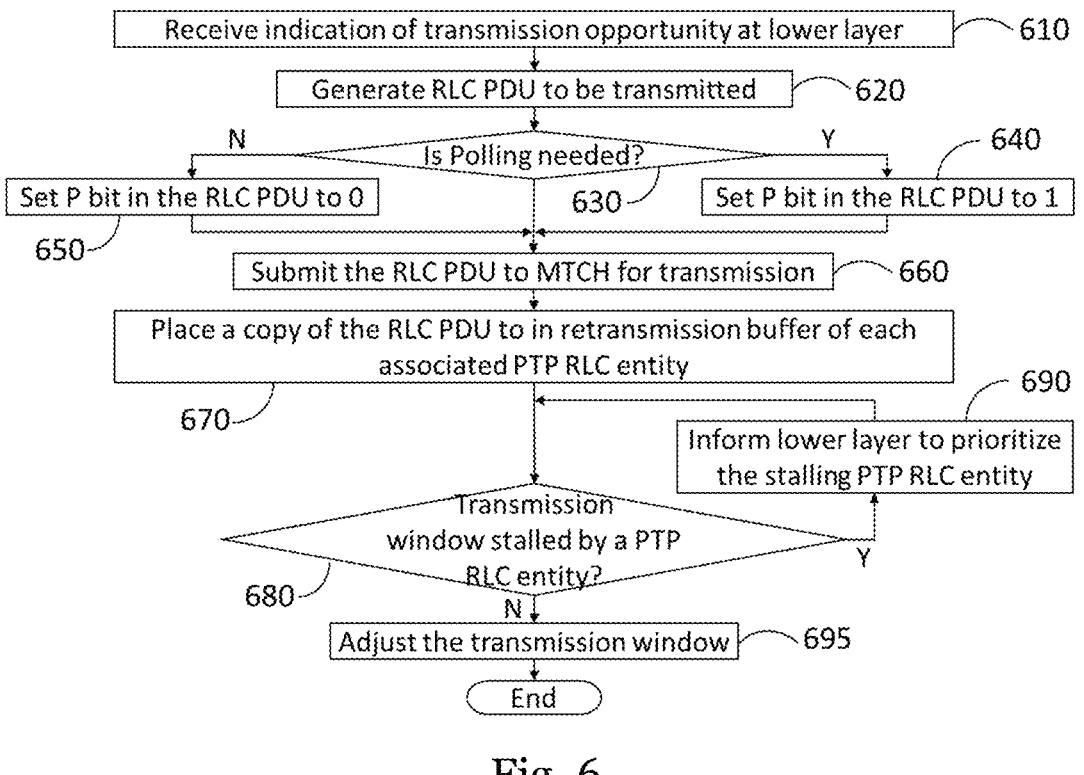
FIG. 6 illustrates a flow diagram of the PTM RLC entity of a gNB according to example embodiments presented herein.

FIG. 6 illustrates a flow diagram of example operations 600 occurring in an RLC entity of a communication equipment. Operations 600 may be indicative of operations occurring in an RLC entity of a communication equipment, as the communication equipment transmits data via an MTCH to UEs. The communication equipment may be a UE or a network equipment such as a gNB, a gNB distributed unit (gNB-DU), an integrated access and backhaul (IAB) node, or a relay.

Operations 600 begin with the RLC entity receiving indication of transmission opportunity present at the lower layers, i.e., the MAC sublayer and physical layer (step 610). Then, the RLC entity generates an RLC PDU from a RLC SDU in its transmission buffer that needs to be transmitted next (step 620). The RLC PDU may contain the whole RLC SDU if the maximal size of the RLC PDU indicated by the lower layer is sufficient for encapsulating the whole RLC SDU; otherwise, the RLC PDU contains a segment of the RLC SDU to fit into the maximal size indicate by the lower layer. The RLC entity also assigns an RLC SN to the RLC SDU and includes that RLC SN in the header of the RLC PDU generated. Then, the RLC entity determines whether it needs to poll the UEs in order to solicit RLC Status PDUs from them (step 630). For example, when PDU_WITHOUT_POLL, which is a counter counting the number of PDUs sent since the most recent poll, exceeds a threshold, the RLC entity determines that it needs to send out a new poll. For another example, when BYTE_WITHOUT_POLL, which is another counter counting the number of bytes sent since the most recent poll, exceeds a threshold, the RLC entity determines that it needs to send out a new poll. For yet another example, when the transmission buffer of the RLC entity will become empty after the current PDU being submitted to the lower layer for transmission, the RLC entity determines that it needs to send out a new poll.

In response to determining that it needs to poll the UEs, the RLC entity sets the Polling (P) bit in the header of the RLC PDU to 1 (step 640); otherwise, it sets the P bit to 0 (step 650). A reversal of the P bit values is possible. Then, the RLC entity submits the RLC PDU to the MTCH for transmission (step 660). The RLC entity places a copy of the RLC PDU in the retransmission buffer of every PTP RLC entity respectively configured for the DTCHs that are associated with the MTCH (i.e., logical channel aggregation between which DTCHs and the MTCH having been respectively enabled) (step 670). The RLC entity determines whether its transmission window is stalled by an PTP RLC entity configured for an associated DTCH (step 680). The transmission window may be stalled, meaning the transmitting window can't be advanced any further and therefore no new data can be transmitted, when the SN representing the upper edge of the transmission window will be confused with any RLC SN of any RLC PDU that is still in the retransmission buffer of a PTP RLC entity configured for a DTCH associated with the MTCH (i.e., logical channel aggregation between which DTCH and the MTCH having been enabled) and pending acknowledgement.

In response to determining that its transmission window is stalled, the RLC entity informs the lower layer to prioritize, when making transmission scheduling decisions, the data queued in the PTP RLC entity that stalls the transmission window (step 690). Steps 680 and 690 may be iterated multiple times before the stalling is alleviated. In response to determining that its transmission window isn't stalled by any associated PTP RLC entity, the RLC entity adjusts its transmission window by incrementing the SNs representing the upper and lower edges of the transmission window. Then, operations 600 may end.

Figure 7:
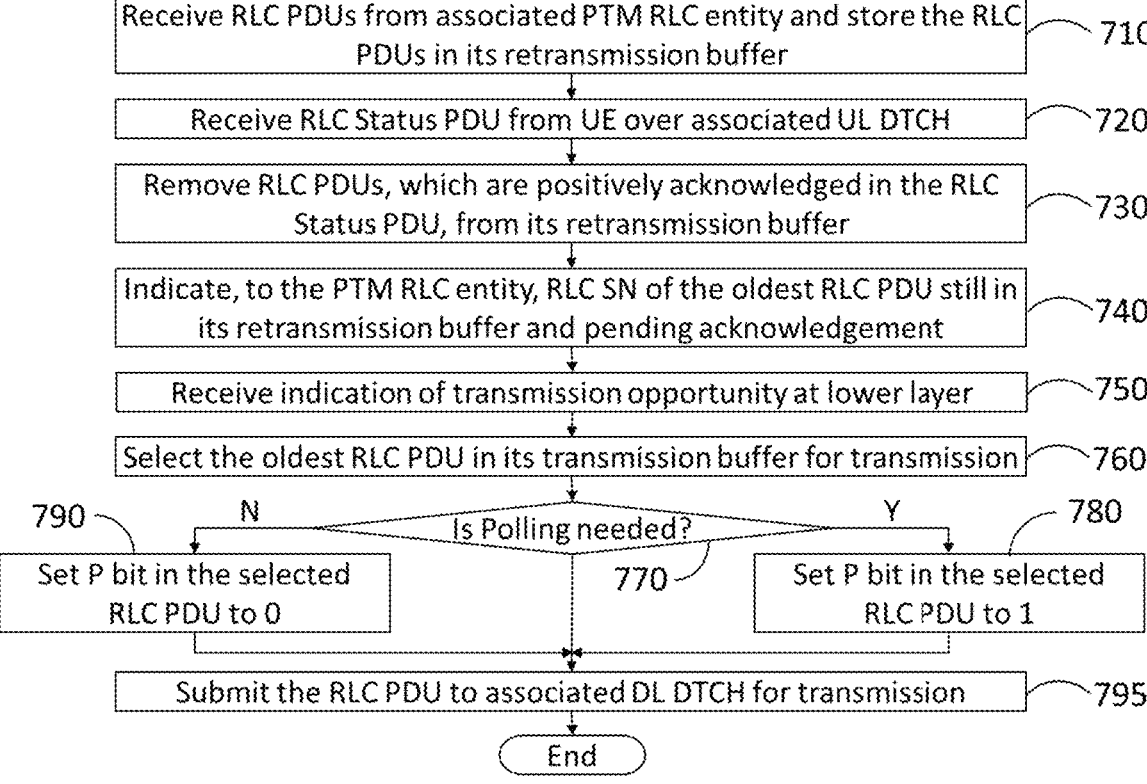
FIG. 7 illustrates a flow diagram of a PTP RLC entity of a gNB according to example embodiments presented herein.

FIG. 7 illustrates a flow diagram of example operations 700 occurring in an RLC entity of a communication equipment. Operations 700 may be indicative of operations occurring in an RLC entity of a communication equipment, as the communication equipment transmits data via a DL DTCH to a UE. The communication equipment may be a UE or a network equipment such as a gNB, a gNB-DU, an IAB node, or a relay.

Operations 700 begin with the RLC entity receiving RLC PDUs from a PTM RLC entity configured for a MTCH, logical channel aggregation between which MTCH and the DL DTCH having been enabled, and storing the received RLC PDUs in its retransmission buffer (step 710). The RLC entity receives an RLC Status PDU from the UE over an UL DTCH configured for the UE (step 720). The RLC Status PDU contains acknowledgements or negative acknowledgements with regard to RLC PDUs received or not received by the UE. The RLC entity removes the RLC PDUs, which are (positively) acknowledged in the RLC Status PDU, from its retransmission buffer (step 730). The RLC entity indicates, to the associated PTM RLC entity, the RLC SN of the oldest RLC PDU remaining in its retransmission buffer and still pending for acknowledgement (such 740). Such indication assists the associated PTM RLC entity in determining whether the transmission window of the PTM RLC entity will be stalled by the RLC entity. The RLC entity receives indication of transmission opportunity present at the lower layers (step 750). Then, the RLC entity selects the oldest RLC PDU in its retransmission buffer as the RLC PDU to be transmitted (step 760). The RLC entity determines if it needs to poll the UE (step 770). In response to determining that it needs to poll the UE, the RLC entity sets the Polling (P) bit in the header of the selected RLC PDU to 1 (step 780); otherwise, it sets the P bit to 0 (step 790). Then, the RLC entity submits the RLC PDU to the DTCH for transmission (step 795). Then, operations 700 may end.

Figure 8:
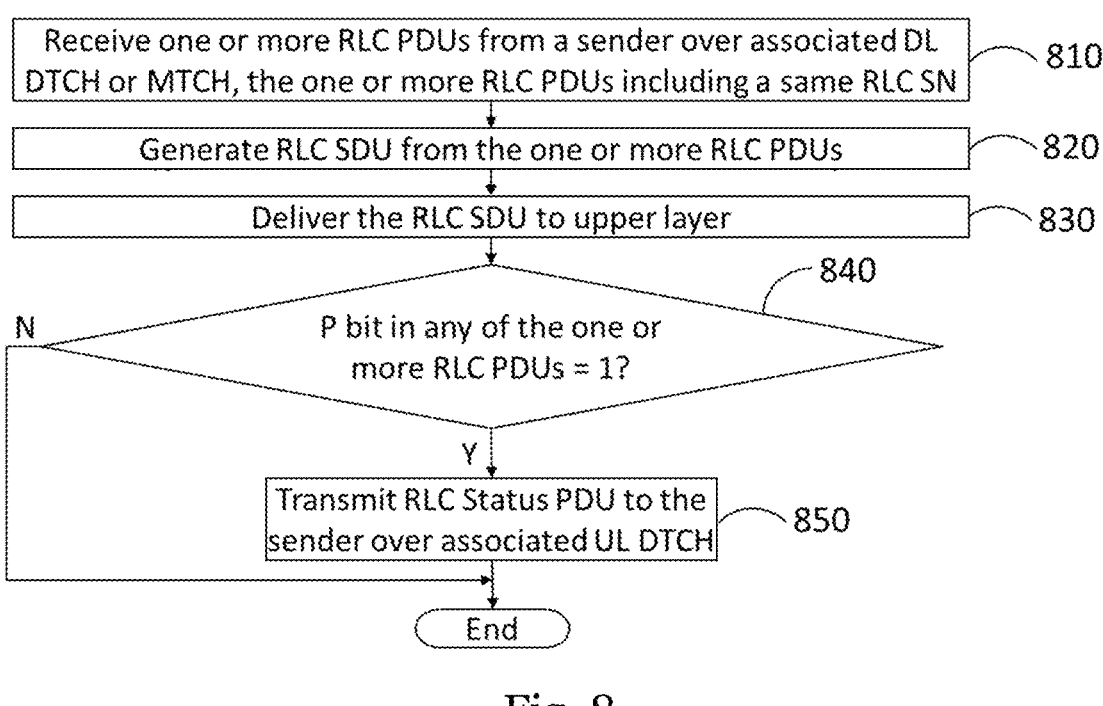
FIG. 8 illustrates a flow diagram of a UE's RLC entity according to example embodiments presented herein.

FIG. 8 illustrates a flow diagram of example operations 800 occurring in an RLC entity of a communication equipment. Operations 800 may be indicative of operations occurring in an RLC entity of a communication equipment, as the communication equipment receives data from a sender via a MTCH and a DL DTCH configured for the communication equipment. The communication equipment may be a UE. The sender may be a UE or a network equipment such as a gNB, a gNB-DU, an IAB node, or a relay.

Operations 800 begin with the RLC entity receiving one or more RLC PDUs from the sender over the MTCH or the DL DTCH, logical channel aggregation between the DL DTCH and the MTCH having been enabled (step 810). Then, the RLC entity generates an RLC SDU from the one or more RLC PDUs (step 820). The generation of the RLC SDU may involve reassembling payloads in more than one RLC PDUs of the one or more RLC PDUs into the RLC SDU. Then, the RLC entity delivers the RLC SDU to upper layer, i.e., a receiving PDCP entity associated with the RLC entity (step 830). The RLC entity determines whether a Polling (P) bit in the RLC header of any RLC PDU of the one or more RLC PDUs being equal to 1 (step 840). A reversed definition of the P bit values is possible. If no, operations 800 may end. If yes, the RLC entity transmits an RLC Status PDU to the sender over an UL DTCH that is configured for the communication equipment (step 850). The RLC Status PDU contains acknowledgements and/or negative acknowledgements with regard to RLC PDUs received or not received by the communication equipment. Then, operations 800 may end.

Figure 9:
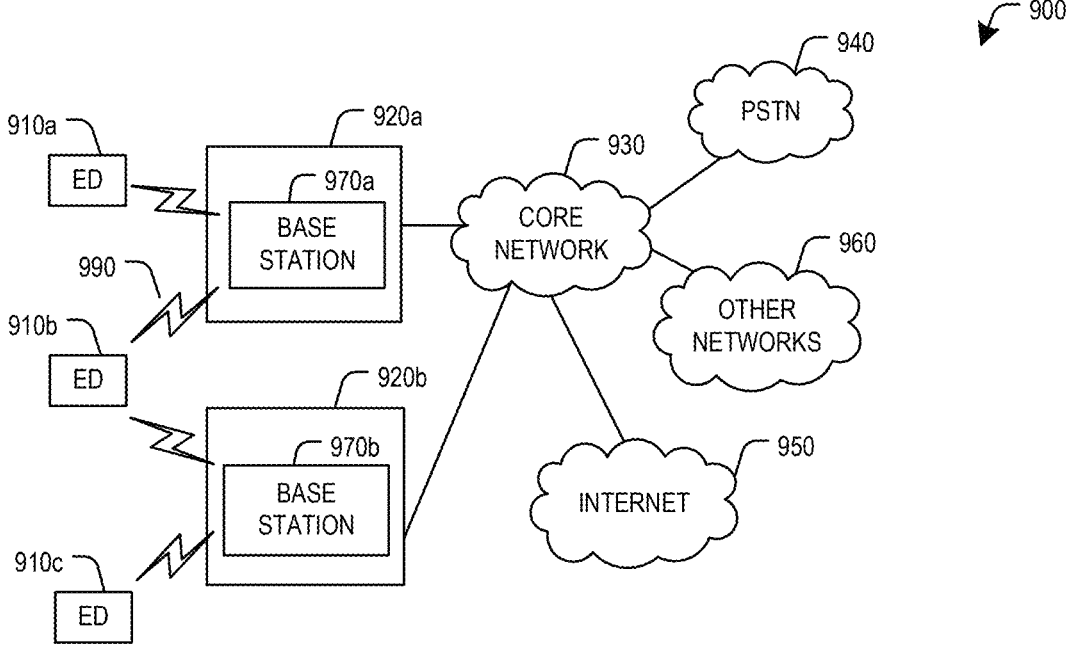
FIG. 9 illustrates an example communication system according to example embodiments presented herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
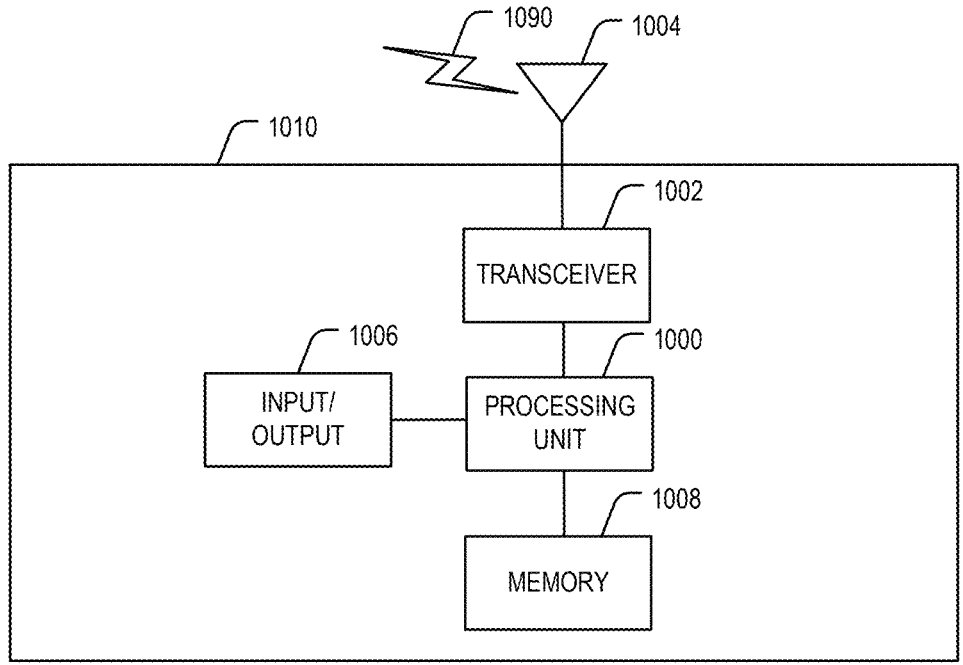
FIGS. 10A and 10B illustrate example devices that may implement the methods and teachings according to this disclosure.
Figure 10B:
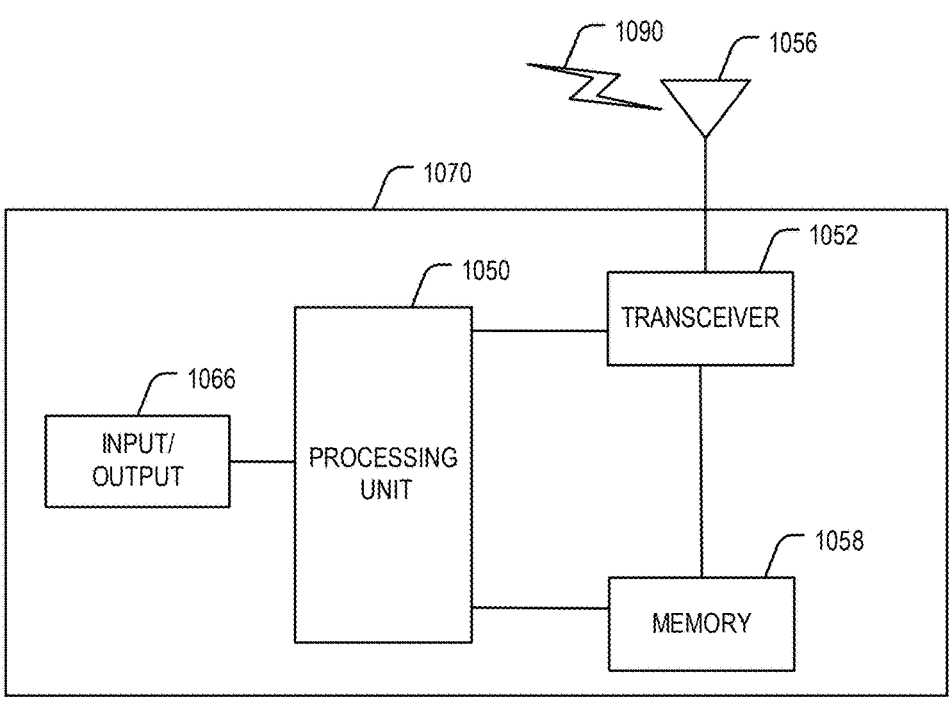

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
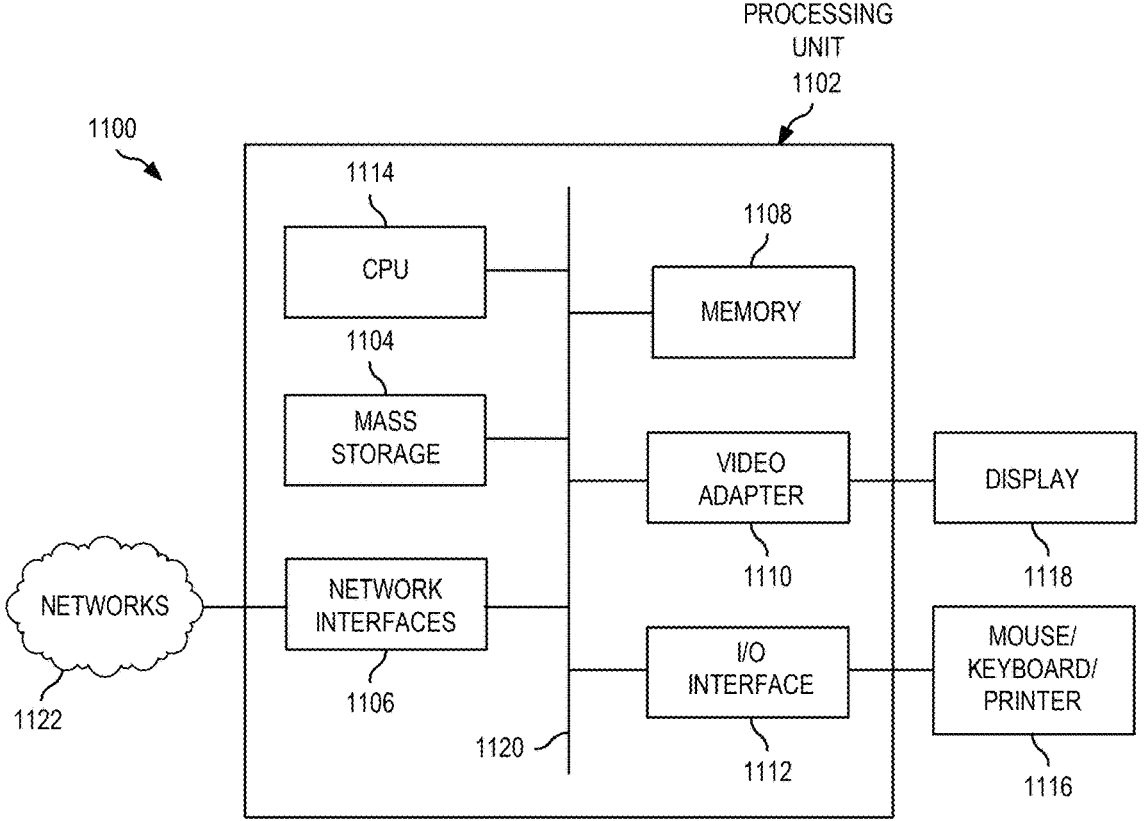
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method, comprising:

receiving, by a first apparatus from a second apparatus, a signaling message; and reconfiguring, by the first apparatus, a receiving radio link control (RLC) entity of the first apparatus to process first data received from a plurality of logical channels in accordance with the signaling message, the receiving RLC entity being configured to process second data received from a first logical channel of the plurality of logical channels prior to being reconfigured, the reconfiguring comprising:

configuring a second logical channel of the plurality of logical channels; and enabling logical channel aggregation of the first logical channel and the second logical channel, wherein the receiving RLC entity is configured to process the first data received from the first logical channel and the second logical channel.

2. The method of claim 1, the signaling message indicating a reconfiguration with a reestablishment of the receiving RLC entity.

3. The method of claim 1, the signaling message indicating a reconfiguration without a reestablishment of the receiving RLC entity.

4. The method of claim 1, a logical channel of the plurality of logical channels being associated with respective transmitting RLC entities of the second apparatus which transmit the first data.

5. The method of claim 1, the reconfiguring comprising:

configuring the first logical channel and the second logical channel of the plurality of logical channels; and enabling the logical channel aggregation of the first logical channel and the second logical channel, wherein the receiving RLC entity is configured to process the first data received from the first logical channel and the second logical channel.

6. The method of claim 1, further comprising:

receiving, from the second apparatus, a second signaling message; and disabling logical channel aggregation in accordance with the second signaling message, wherein the receiving RLC entity is configured to:

stop processing the first data received from the plurality of logical channels, and process third data received from a logical channel of the plurality of logical channels.

7. The method of claim 1, the reconfiguring comprising:

changing the receiving RLC entity; or changing to a second receiving RLC entity.

8. A first apparatus, comprising:

at least one processor; and a non-transitory computer readable storage medium storing programming, the programming including instructions that, when executed by the at least one processor, cause the first apparatus to perform operations including:

receiving, from a second apparatus, a signaling message; and reconfiguring a receiving radio link control (RLC) entity of the first apparatus to process first data received from a plurality of logical channels in accordance with the signaling message, the receiving RLC entity being configured to process second data received from a first logical channel of the plurality of logical channels prior to being reconfigured, the reconfiguring comprising:

configuring a second logical channel of the plurality of logical channels; and enabling logical channel aggregation of the first logical channel and the second logical channel, wherein the receiving RLC entity is configured to process the first data received from the first logical channel and the second logical channel.

9. The first apparatus of claim 8, the signaling message indicating a reconfiguration with a reestablishment of the receiving RLC entity.

10. The first apparatus of claim 8, the signaling message indicating a reconfiguration without a reestablishment of the receiving RLC entity.

11. The first apparatus of claim 8, a logical channel of the plurality of logical channels being associated with respective transmitting RLC entities of the second apparatus which transmit the first data.

12. The first apparatus of claim 8, the reconfiguring comprising:

configuring the first logical channel and the second logical channel of the plurality of logical channels; and enabling the logical channel aggregation of the first logical channel and the second logical channel, wherein the receiving RLC entity is configured to process the first data received from the first logical channel and the second logical channel.

13. The first apparatus of claim 8, the operations further comprising:

receiving, from the second apparatus, a second signaling message; and disabling logical channel aggregation in accordance with the second signaling message, wherein the receiving RLC entity is configured to:

stop processing the first data received from the plurality of logical channels, and process third data received from a logical channel of the plurality of logical channels.

14. The first apparatus of claim 8, the reconfiguring comprising:

changing the receiving RLC entity; or changing to a second receiving RLC entity.

15. A non-transitory computer-readable medium having instructions stored thereon that, when executed by a first apparatus, cause the first apparatus to perform operations, the operations comprising:

receiving, from a second apparatus, a signaling message; and reconfiguring a receiving radio link control (RLC) entity of the first apparatus to process first data received from a plurality of logical channels in accordance with the signaling message, the receiving RLC entity being configured to process second data received from a first logical channel of the plurality of logical channels prior to being reconfigured, the reconfiguring comprising:

configuring a second logical channel of the plurality of logical channels; and enabling logical channel aggregation of the first logical channel and the second logical channel, wherein the receiving RLC entity is configured to process the first data received from the first logical channel and the second logical channel.

16. The non-transitory computer-readable medium of claim 15, the signaling message indicating a reconfiguration with a reestablishment of the receiving RLC entity.

17. The non-transitory computer-readable medium of claim 15, the signaling message indicating a reconfiguration without a reestablishment of the receiving RLC entity.

18. The non-transitory computer-readable medium of claim 15, a logical channel of the plurality of logical channels being associated with respective transmitting RLC entities of the second apparatus which transmit the first data.

19. The non-transitory computer-readable medium of claim 15, the reconfiguring comprising:

configuring the first logical channel and the second logical channel of the plurality of logical channels; and enabling the logical channel aggregation of the first logical channel and the second logical channel, wherein the receiving RLC entity is configured to process the first data received from the first logical channel and the second logical channel.

20. The non-transitory computer-readable medium of claim 15, the operations further comprising:

receiving, from the second apparatus, a second signaling message; and disabling logical channel aggregation in accordance with the second signaling message, wherein the receiving RLC entity is configured to:

stop processing the first data received from the plurality of logical channels, and process third data received from a logical channel of the plurality of logical channels.

* * * * *